United States Patent

Kalwaites

[15] 3,659,765
[45] May 2, 1972

[54] METHOD FOR FIBRILLATING A TRANSVERSELY ORIENTED PLASTIC MATERIAL

[72] Inventor: Frank Kalwaites, Somerville, N.J.
[73] Assignee: Johnson & Johnson
[22] Filed: Aug. 11, 1969
[21] Appl. No.: 870,877

Related U.S. Application Data

[62] Division of Ser. No. 710,611, Mar. 5, 1968, Pat. No. 3,515,325.

[52] U.S. Cl. ................................225/4, 28/DIG. 1, 225/93
[51] Int. Cl. ........................................................B26f 3/02
[58] Field of Search ...................225/1, 3, 4, 2, 93, 96, 97; 28/1 F; 57/31

[56] References Cited

UNITED STATES PATENTS 3,424,358  1/1969  Robinson et al. ..........................225/3
3,427,654  2/1969  Rasmussen ...............................225/3

*Primary Examiner*—Frank T. Yost
*Attorney*—Robert L. Minier, John H. Tregoning and Alexander T. Kardos

[57] ABSTRACT

Method for fibrillating transversely oriented plastic material by moving the material in the direction of its length at a given speed and instantaneously and simultaneously applying compressive forces and longitudinal forces to the material while maintaining the speed at which it is moving to split the material into a web of interconnected fibers.

1 Claims, 2 Drawing Figures

Patented May 2, 1972

3,659,765

INVENTOR
FRANK KALWAITES
BY
ATTORNEY

METHOD FOR FIBRILLATING A TRANSVERSELY ORIENTED PLASTIC MATERIAL

This is a division of application Ser. No. 710,611, filed Mar. 5, 1968 now U.S. Pt. No. 2,515,325.

This invention relates to a method and apparatus for fibrillating transversely oriented plastic films to produce split fiber webs.

It is known that when films are highly oriented; i.e., up to fiber type orientations, that when forces are applied to these films they can be disrupted into fibrous type networks. By fiber type orientation it is meant that the fiber has a high degree of parallel orientation in one direction and very little strength perpendicular to that direction. The problems splitting such oriented films has been that to disrupt these highly oriented films and produce a fiber network the forces for disruption must be applied uniformly over the entire film area and forces must be such that they do not completely tear the film and merely produce shreds. The forces must be applied over very small incremental areas of the film and they must be applied uniformly over the entire area of the film.

In accordance with the present invention I have discovered a method for applying these forces uniformly over the entire areas of the film and over very small incremental portions along the length of the film to produce a uniformly fibrillated web.

In accordance with the method of the present invention a transversely oriented film is moved continuously in its longitudinal direction. The film is moved at a given and controlled speed. Simultaneously, instantaneous compressive and longitudinal forces are applied to the film while maintaining the speed of the film at its given speed. These forces uniformly fibrillate the film into a web of interconnected fibers.

Apparatus for carrying out the method of the present invention comprises a pair of rotatable rolls positioned adjacent each other with their axis parallel to form a nip. The transversely oriented film is passed in its longitudinal direction through this nip. One of the rolls of the nip is non-resilient while the other roll is resilient. The non-resilient roll rotates at a given speed. In contact with the surface of this non-resilient roll immediately adjacent the input side of the nip is a blade. The blade contacts the surface of the roll along a line parallel to the axis of the roll. As the film is fed under the blade, the blade forces the film onto the surface of the non-resilient roll so that the film has the speed of the non-resilient roll as the film passes through the nip. The other roll is resilient and is pressed against the non-resilient roll. The resilient roll is rotated at a faster peripheral linear speed than the non-resilient roll. The resilient roll applies both compressive and longitudinal forces to the transversely oriented film as the film passes through the nip and fibrillates it into a web of interconnected fibers.

The invention will be more fully described when taken in conjunction with the accompanying drawings wherein.

The films which may be utilized in accordance with the present invention are preferably the polyolefin films such as polyethylene or polypropylene though the polyamides or polyesters may also be used if desired. The film is transversely oriented and is oriented to a sufficient degree so that it will readily form fibers, that is it is unilaterally oriented in the transverse direction to a relatively high degree. The amount of orientation in order to provide for splitting of the film is well known in the art.

Figure 1:
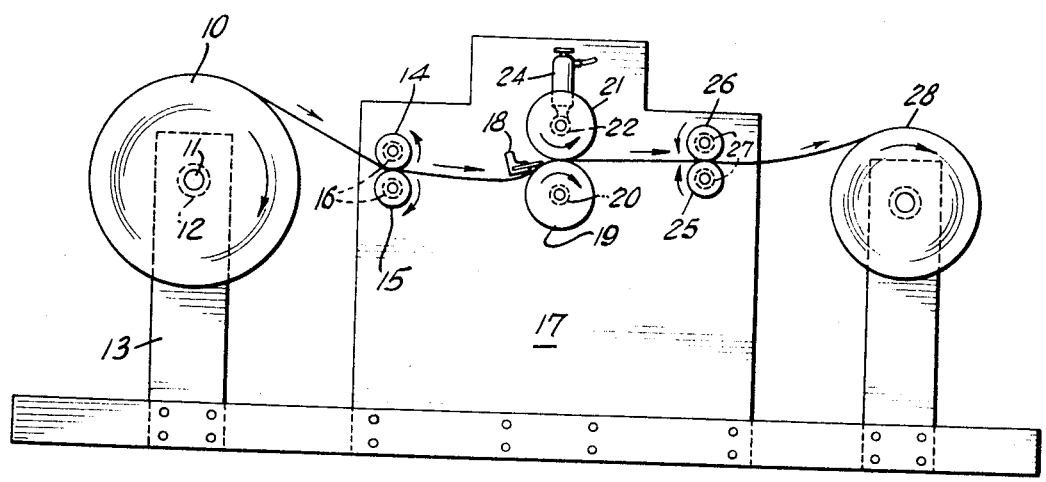
FIG. 1 is a side elevational view of the apparatus for carrying out the method of the present invention.

Referring to FIG. 1 a transversely oriented film 10 is mounted on a shaft 11 mounted for rotation in bearings 12 mounted in suitable framing 13. The film passes through a pair of guide rollers 14 and 15 which preferably are driven by standard motors and pulleys. The guide rollers are mounted for rotation in bearings 16 mounted in the frame 17. After passing through the guide rolls the film passes underneath a blade 18 and onto the surface of a non-resilient roll 19. The non-resilient roll is mounted in bearings 20 mounted in the frame 17 and rotates in the direction of the arrow shown. The blade is stationarily mounted from the frame 17 and preferably may be spring adjustable so as to be able to vary the pressure on the roll 19. Mounted adjacent the non-resilient roll is a resilient roll 21 which has its axis parallel to the axis of the non-resilient roll and by suitable pressure applying means 22 such as air cylinders or hydraulic cylinders is in pressing contact with the non-resilient roll. The resilient roll is also mounted for rotation in bearings 22 mounted in the frame 17. The non-resilient roll is driven by standard motors and pulleys or other suitable drive means and may be suitable geared to the resilient roll to drive the resilient roll at the desired speed or if desired the resilient roll may be separately driven. The rolls rotate in opposite directions as shown by their arrows and the resilient roll is rotated at a faster peripheral linear speed than the non-resilient roll. On passing through the nip the film is fibrillated or split into a network of fibers and is passed through a second set of guide rolls 25 and 26 mounted for rotation in bearings 27 mounted in the frame 17. These rolls may also be driven. The split fiber is wound up on a standard wind-up mechanism 28.

Figure 2:
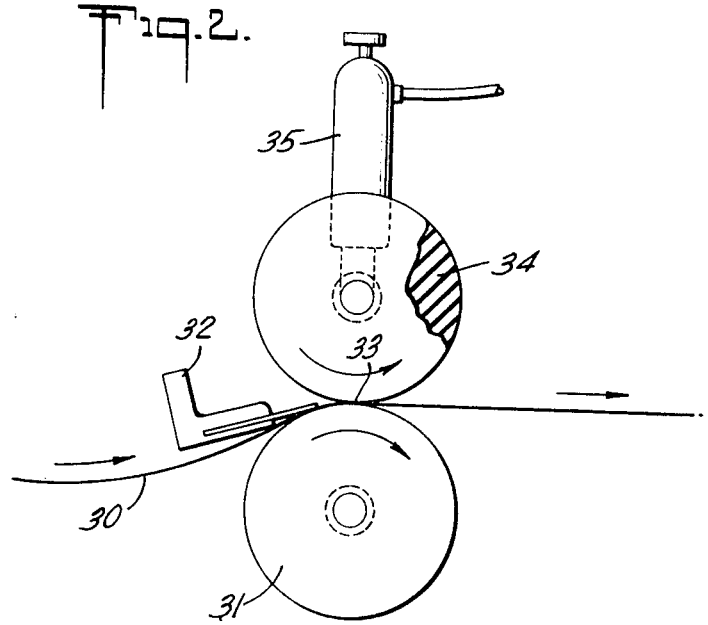
FIG. 2 is an enlarged cross-sectional view of the apparatus for instantaneously and simultaneously applying compressive and longitudinal forces to the transversely oriented film.

As is more clearly shown in FIG. 2 the transversely oriented film 30 is passed onto the surface of the non-resilient roll 31 by means of the stationary blade 32 which is in contact with the non-resilient roll along a line parallel to the axis of the roll. This line of contact is immediately adjacent the nip 33 formed by the non-resilient roll and the resilient roll 34. The blade is in pressing contact and is preferably spring mounted to force the film onto the surface of the non-resilient roll so that the film takes the speed of the roll 31.

Immediately adjacent the stationary blade is the resilient roll 34 which has its axis parallel to the non-resilient roll and is in contact therewith. Suitable loading means 35 such as pneumatic cylinders or hydraulic cylinders urge the resilient roll against the non-resilient roll at the desired pressure. The resilient roll is driven in the direction of the arrow shown and is driven at a speed greater than the peripheral linear speed of the non-resilient roll. The pressing action of the resilient roll and its increased speed applies compressive and longitudinal forces to the film as it passes through the nip. These forces are placed over the entire width of the film and are placed over very small incremental areas of the film as it passes between the nip to uniformly and completely split or fibrillate the film into a web of interconnected fibers.

The non-resilient roll may be made of various types of materials, for example, metal, hard plastics, etc. It is preferred that the surface be frictional such as knurled or sandblasted or some similar type of of surface to grip and hold the film so that the film maintains the speed of the non-resilient roll. The blade is preferably made of tempered steel so that it may be pressed against the surface of the non-resilient roll and contact is made along the entire roll width. The resilient roll is preferably made of medium hard rubber or similar resilient materials, even plastic materials so that it may be urged against the non-resilient roll. In operation it is preferred that the resilient roll rotate at about twice or more times the peripheral linear speed of the non-resilient roll.

Although all of the various holders, pulleys, belts, and like mechanical means, including suitable framing and pressure loading means, have not been illustrated completely in the drawings or described in the specification for driving, pressing, or supporting the various rotating rolls, at their desired or required speeds or with the rotation or movement indicated by the direct arrows it is to be appreciated that such elements have been omitted to keep the drawings and description distinct and to avoid the introduction of matters which are well known expedients in the art. The mechanical driving means, pressure means, and various frames which are used are conventional and merely involve the application of well known mechanical principles.

It is to be understood that various changes and modifications may be made in the method and apparatus as herein described without departing from the spirit and scope of the claimed invention.

I claim:

1. A method of manufacturing a split fiber web from a transversely oriented plastic film comprising: moving the transversely oriented film in the direction of its length and at a given speed, simultaneously applying instantaneous compressive and longitudinal forces across the width of the film while maintaining the speed of the film at its given speed and removing the film from the application of said forces while maintaining the film at said given speed to split the film into a web of interconnected fibers.

* * * * *